(12) United States Patent
Wang et al.

(10) Patent No.: US 11,100,095 B2
(45) Date of Patent: *Aug. 24, 2021

(54) SERVICE PROCESSING SYSTEM AND METHOD BASED ON BLOCKCHAIN

(71) Applicant: ADVANCED NEW TECHNOLOGIES CO., LTD., Grand Cayman (KY)

(72) Inventors: Zhenyu Wang, Hangzhou (CN); Songbo Yue, Hangzhou (CN); Nan Li, Hangzhou (CN); Yu Yan, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/176,254

(22) Filed: Feb. 16, 2021

(65) Prior Publication Data

US 2021/0165781 A1 Jun. 3, 2021

Related U.S. Application Data

(63) Continuation of application No. 16/886,686, filed on May 28, 2020, now Pat. No. 10,942,920, which is a (Continued)

(30) Foreign Application Priority Data

Jun. 3, 2019 (CN) .......................... 201910478105.0

(51) Int. Cl.
*H04L 9/08* (2006.01)
*H04L 9/06* (2006.01)
(Continued)

(52) U.S. Cl.
CPC ........ *G06F 16/2379* (2019.01); *G06F 16/152* (2019.01); *H04L 9/0637* (2013.01);
(Continued)

(58) Field of Classification Search
CPC ... H04L 29/06; H04L 9/32; H04L 9/06; H04L 9/08; H04L 9/30; H04L 9/0637;
(Continued)

(56) References Cited

U.S. PATENT DOCUMENTS

| | | |
|---|---|---|
| 7,451,116 B2 | 11/2008 | Parmelee et al. |
| 7,840,993 B2 | 11/2010 | Ganesan et al. |

(Continued)

FOREIGN PATENT DOCUMENTS

| | | |
|---|---|---|
| AU | 2016378211 A1 | 6/2018 |
| CN | 1953375 B | 5/2010 |

(Continued)

OTHER PUBLICATIONS

First Search dated Apr. 25, 2020, issued in related Chinese Application No. 201910478105.0 (1 page).
(Continued)

*Primary Examiner* — Jayesh M Jhaveri

(57) ABSTRACT

Methods, systems, and apparatus, including computer programs encoded on computer storage media, for blockchain-based file querying are provided. One of the methods includes: receiving a query request for a target file, the query request comprising identification information of a user and the target file; obtaining the target file based on the identification information of the user and the target file; providing a query page of the target file, the query page comprising interactive elements for selecting whether to upload the target file to a blockchain; receiving a user selecting to upload the target file to the blockchain; hashing the target file to generate a digital digest; signing the digital digest
(Continued)

according to an asymmetric encryption algorithm using a private key associated with a cryptographic key pair to obtain a digital signature; and uploading the target file, the digital signature, and a public key associated with the cryptographic key pair.

20 Claims, 6 Drawing Sheets

Related U.S. Application Data continuation of application No. PCT/CN2020/071230, filed on Jan. 9, 2020.

(51) Int. Cl.
*H04L 9/30* (2006.01)
*H04L 9/32* (2006.01)
*G06F 16/23* (2019.01)
*G06F 16/14* (2019.01)

(52) U.S. Cl.
CPC .......... *H04L 9/0643* (2013.01); *H04L 9/0825* (2013.01); *H04L 9/3073* (2013.01); *H04L 9/3247* (2013.01); *H04L 2209/38* (2013.01)

(58) Field of Classification Search
CPC ... H04L 9/0643; H04L 9/0825; H04L 9/3073; H04L 9/3247; H04L 2209/38; G06F 16/23; G06F 16/14; G06F 16/2379; G06F 16/152
See application file for complete search history.

(56) References Cited

U.S. PATENT DOCUMENTS

| | | | |
|---|---|---|---|
| 9,059,856 | B2 | 6/2015 | Lin et al. |
| 9,542,671 | B2 | 1/2017 | Tien et al. |
| 9,948,467 | B2 | 4/2018 | King |
| 10,121,143 | B1 | 11/2018 | Madisetti et al. |
| 10,505,920 | B2 | 12/2019 | Kumar et al. |
| 2009/0210702 | A1 | 8/2009 | Welingkar et al. |
| 2018/0287800 | A1 | 10/2018 | Chapman et al. |
| 2018/0374091 | A1 | 12/2018 | Madisetti et al. |
| 2019/0013932 | A1 | 1/2019 | Maino et al. |
| 2019/0013934 | A1 | 1/2019 | Mercuri |
| 2019/0108140 | A1 | 4/2019 | Deshpande et al. |
| 2019/0332783 | A1* | 10/2019 | Bhardwaj ............. H04L 9/3239 |
| 2019/0340369 | A1* | 11/2019 | Hadi .................. G06K 9/00161 |
| 2019/0342084 | A1 | 11/2019 | Mehedy et al. |
| 2019/0356493 | A1 | 11/2019 | Fisher et al. |
| 2019/0379545 | A1 | 12/2019 | Wong |
| 2020/0127842 | A1 | 4/2020 | Winarski |
| 2020/0153637 | A1 | 5/2020 | Sakai et al. |
| 2020/0169411 | A1 | 5/2020 | Drake et al. |
| 2020/0204376 | A1 | 6/2020 | Nandakumar et al. |
| 2020/0258176 | A1* | 8/2020 | Gibson ................. H04L 9/3239 |
| 2020/0272619 | A1 | 8/2020 | Alferov |
| 2020/0356546 | A1* | 11/2020 | Keskar .................. H04L 9/0643 |

FOREIGN PATENT DOCUMENTS

| | | |
|---|---|---|
| CN | 107819777 A | 3/2018 |
| CN | 108197891 A | 6/2018 |
| CN | 108369697 A | 8/2018 |
| CN | 108550037 A | 9/2018 |
| CN | 109064120 A | 12/2018 |
| CN | 109257180 A | 1/2019 |
| CN | 109784870 A | 5/2019 |
| CN | 110349056 A | 10/2019 |
| CN | 108701136 B | 6/2020 |
| JP | 4879176 B2 | 2/2012 |
| JP | 5166654 B2 | 3/2013 |
| JP | 2018-536957 A | 12/2018 |

OTHER PUBLICATIONS

First Office Action dated May 6, 2020, issued in related Chinese Application No. 201910478105.0, with English machine translation (15 pages).

Second Office Action dated Jun. 30, 2020, issued in related Chinese Application No. 201910478105.0, with English machine translation (12 pages).

Written Opinion of the International Searching Authority and International Search Report for PCT Application No. PCT/CN2020/071230 made available to public dated Dec. 10, 2020.

* cited by examiner

SERVICE PROCESSING SYSTEM AND METHOD BASED ON BLOCKCHAIN

CROSS-REFERENCE TO RELATED APPLICATION

This application is a continuation application of U.S. patent application Ser. No. 16/886,686 filed May 28, 2020, which is a continuation application of International Patent Application No. PCT/CN2020/071230, filed with the China National Intellectual Property Administration (CNIPA) on Jan. 9, 2020. International Patent Application No. PCT/CN2020/071230 is based on and claims priority to and benefit of Chinese Patent Application No. 201910478105.0, filed with the CNIPA on Jun. 3, 2019. The entire contents of all of the above-identified applications are incorporated herein by reference.

TECHNICAL FIELD

The specification relates to the field of blockchain technologies, and in particular, to a service processing system, method, apparatus, electronic device based on a blockchain, and a computer readable storage medium.

BACKGROUND

More and more financial products are provided with the economic development. For existing financial projects, because there are various supply-demand relationships between a supply side and a demand side, an overall structure of financial projects is complex.

In the conventional method, two parties of a commercial relationship sign a paper commercial contract to ensure the commercial relationship thereof. With the development of networks, a new contract technology, that is, an electronic contract, is gradually popularized and used. The electronic contract can improve the production efficiency and security, shorten a contract signing time, reduce a contract error rate, reduce contract risks, and the like.

However, the existing technologies still have some disadvantages. For example, currently, a user lacks an effective measure to check whether the electronic contract has been tampered. Likewise, if a financial institution wants to prove that the financial institution has not modified information of an electronic contract, information of the electronic contract needs to be notarized in advance. The current proofing method is mainly a manual procedure, for example, notarization at in a notary office, and there is a lack of an automatic method. The efficiency is low, the cost is high, and the cycle is long. Moreover, it is difficult to provide overall privacy protection for the information related to the electronic contract.

SUMMARY

Accordingly, embodiments of the specification provide a service processing system, method, apparatus, electronic device based on a blockchain, and a computer readable storage medium, to resolve the technical disadvantages in the existing technologies.

According to a first aspect of the embodiments of the specification, a service processing system based on a blockchain is provided, including: a requesting client, a server, and at least two blockchain nodes on the blockchain, wherein the requesting client is configured to send a query request for a target file to the server, the query request for a target file carrying identification information of a user and identification information of the target file; the server is configured to receive the query request for a target file, obtain a target file and accept a query for a target file of the user, send, to the user, prompt information of whether to upload the target file to a blockchain node, and upload the target file to the blockchain node if a request for uploading a target file of the user is received; and the blockchain node is configured to receive the target file, store the target file, and return a corresponding record hash value to the requesting client.

In an embodiment, the server is further configured to: hash the target file according to a preset algorithm to generate a corresponding digital digest; sign the digital digest with a private key by using an asymmetric encryption algorithm to generate a corresponding digital signature; and upload a public key, the target file, and the digital signature to the blockchain node; and the blockchain node is further configured to: receive the public key, the target file, and the digital signature; perform a validity check on the target file according to the public key and the digital signature; and after the validity check of the target file succeeds, store the digital digest that is generated by hashing the target file according to the preset algorithm, and return the corresponding record hash value to the server.

In an embodiment, the server is further configured to: provide a query page for a target file for the user, the query page for a target file being configured to comprise a prompt box for prompting whether to upload the target file to the blockchain node, and the prompt box being configured to comprise an option button clickable by the user; detect a selection result of the user; and upload the target file to the blockchain node if the selection result of the user is confirming to upload.

In an embodiment, the requesting client is further configured to: send a query request for digest information of the target file to the blockchain node, the query request for digest information of the target file carrying the record hash value; the blockchain node is further configured to receive the query request for digest information of the target file, obtain file digest information of the target file and a download address of the target file according to the record hash value; and send the digest information of the target file and the download address of the target file to the requesting client; and the requesting client is further configured to receive the digest information of the target file and the download address of the target file, and download the target file according to the download address of the target file.

In an embodiment, the blockchain node is further configured to: decrypt the digital signature by using the public key to generate a first digital digest; hash the target file according to the preset algorithm to generate a second digital digest; compare whether the first digital digest is consistent with the second digital digest; if yes, determine that the validity check of the target file succeeds; otherwise, send, to the server, prompt information indicating that the validity check fails.

In an embodiment, the requesting client is further configured to: send a query request for digest information of the target file to the server, the query request for digest information of the target file carrying the identification information of the target file; the server is further configured to: receive the query request for digest information of the target file; determine, according to the identification information of the target file, whether the corresponding record hash value exists; and if the corresponding record hash value exists, send the record hash value to the requesting client; and the requesting client is further configured to receive the record hash value.

In an embodiment, the server is further configured to: if it is determined, according to the identification information of the target file, that the corresponding record hash value does not exist, send, to the requesting client, prompt information indicating that information is being uploaded to the blockchain node.

In an embodiment, the blockchain node is further configured to: after the validity check of the target file succeeds, return, to the server and the requesting client respectively, a call result indicating that the digital digest of the target file has been received successfully; and after the digital digest of the target file is stored, return the corresponding record hash value to the server.

In an embodiment, the requesting client is further configured to: receive a contract signing transaction initiated by the server, the contract signing transaction being used for triggering an electronic signature operation on a target file transmission contract; perform an electronic signature operation in response to the contract signing transaction; and send the signed target file transmission contract to the server; and the server is further configured to receive the signed target file transmission contract sent by the requesting client, and send, to the blockchain node, the target file transmission contract, the target file, and the digital signature that is obtained by hashing the target file.

In an embodiment, the service processing system based on a blockchain further includes: a first transaction terminal and a second transaction terminal, wherein the first transaction terminal is configured to upload a file template to the server; the server is further configured to receive the file template, and send, to the second transaction terminal, prompt information of whether to upload the file template to the blockchain node, the prompt information carrying identification information of the file template; the second transaction terminal is configured to receive the prompt information, determine a selection result based on the prompt information, and send information carrying the selection result to the server; the server is further configured to receive the information that is sent by the second transaction terminal and that carries the selection result, and send the file template to the blockchain node if the selection result carried in the information is confirming to upload; the blockchain node is further configured to receive the file template, store the file template, return a hash value indicating that in the file template is written to the blockchain succeeds, and send the hash value to the server; and the server is configured to receive the hash value and save the hash value in a database.

In an embodiment, the requesting client is further configured to send a request for joining a project to the server, the request for joining a project carrying the identification information of the user and identification information of the project; the server is further configured to receive the request for joining a project; determine, according to the identification information of the project, a file template and detail information of the project that are associated with a project; generate a first target file related to the project according to the detail information of the project, the identification information of the user and the file template; and initiate a file signing transaction to the requesting client, the file signing transaction being used for triggering electronical signing of the first target file; the requesting client is further configured to receive the file signing transaction initiated by the server, perform an electronic signature operation on the first target file in response to the file signing transaction, and send a signed second target file to the server; and the server is further configured to: receive the second target file, and perform a certification and seal operation on the second target file based on a certificate authority certificate.

According to another aspect of the embodiments of the specification, a service processing method based on a blockchain is provided, including: receiving a query request for a target file, the query request for a target file carrying identification information of a user and identification information of the target file; obtaining a target file according to the identification information of the user and the identification information of the target file and accepting a query for a target file of the user; sending, to the user, prompt information of whether to upload the target file to a blockchain node; and uploading the target file to the blockchain node if a request for uploading a target file of the user is received.

In an embodiment, the uploading the target file to the blockchain node includes: hashing the target file according to a preset algorithm to generate a corresponding digital digest; signing the digital digest with a private key by using an asymmetric encryption algorithm to generate a corresponding digital signature; and uploading a public key, the digital signature, and the target file to the blockchain node. In an embodiment, after the uploading the target file to the blockchain node, the method further includes: receiving a record hash value returned by the blockchain node.

In an embodiment, the sending, to the user, prompt information of whether to upload the target file to a blockchain node includes: providing a query page for a target file for the user, the query page for a target file being configured to comprise a prompt box for prompting whether to upload the target file to the blockchain node, and the prompt box being configured to comprise an option button clickable by the user; detecting a selection result of the user; and the uploading the target file to the blockchain node if a request for uploading a target file of the user is received includes: uploading the target file to the blockchain node if the selection result of the user is confirming to upload.

In an embodiment, after the uploading the target file to the blockchain node, the method further includes: receiving a query request for digest information of the target file, and determining, according to the identification information of the target file, whether the corresponding record hash value exists; if yes, sending the record hash value to the requesting client; and if no, sending, to the requesting client, prompt information indicating that information is being uploaded to the blockchain node.

In an embodiment, the uploading the target file to the blockchain node if a request for uploading a target file of the user is received includes: initiating a contract signing transaction to the user if the request for uploading a target file of the user is received, the contract signing transaction being used for triggering an electronic signature operation on a target file transmission contract; and receiving the signed target file transmission contract sent by the user, and sending, to the blockchain node, the target file transmission contract, the target file and the digital signature that is generated by hashing the target file.

In an embodiment, before the receiving a query request for a target file, the method further includes: receiving a file template, and sending, to a second transaction terminal, prompt information of whether to upload a file template to the blockchain node, the prompt information carrying identification information of the file template; receiving information that is sent by the second transaction terminal and that carries the selection result, and sending the file template to the blockchain node if the selection result carried in the information is confirming to upload; and receiving a hash value, which is returned by the blockchain node, indicating that the file template is written into the blockchain successfully, and saving the hash value in a database.

According to another aspect of the embodiments of the specification, a service processing apparatus based on a blockchain is provided, including: a file query request receiving module, configured to receive a query request for a target file, the query request for a target file carrying identification information of a user and identification information of the target file; a query for a target file module, configured to obtain a target file according to the identification information of the user and the identification information of the target file, and accept a query for a target file of the user; a prompt information sending module, configured to send, to the user, prompt information of whether to upload the target file to the blockchain node; and a target file transmission module, configured to upload the target file to the blockchain node if a request for uploading a target file of the user is received.

According to another aspect of the embodiments of the specification, an electronic device is provided, including a memory, a processor, and computer instructions stored in the memory and operable on the processor, the instructions, when executed by the processor, implement steps of the service processing method based on a blockchain.

According to another aspect of the embodiments of the specification, a computer readable storage medium is provided, which stores computer instructions, the instructions, when executed by the processor, implement steps of the service processing method based on a blockchain.

In the embodiments of the specification, a requesting client sends a query request for a target file to a server, the query request for a target file carrying identification information of a user and identification information of the target file. The server receives the query request for a target file, obtains a target file and allows the user to perform a query for a target file, sends, to the user, prompt information of whether to upload the target file to a blockchain node, and uploads the target file to the blockchain node if a request for uploading a target file of the user is received. The blockchain node receives the target file, stores the target file, and returns a corresponding record hash value to the requesting client.

In another aspect, a method for blockchain-based file querying is provided. The method includes: receiving, by a server from a client, a query request for a target file, the query request comprising identification information of a user and identification information of the target file; obtaining, by the server, the target file based on the identification information of the user and the identification information of the target file; providing, by the server to the client, a query page associated with the target file, the query page comprising one or more interactive elements for selecting whether to upload the target file to a blockchain; receiving, by the server from the client, a user input selecting to upload the target file to the blockchain; in response to receiving the user input, hashing, by the server, the target file to generate a digital digest; signing, by the server, the digital digest according to an asymmetric encryption algorithm using a private key associated with a cryptographic key pair to obtain a digital signature; and uploading, by the server to one or more blockchain nodes associated with the blockchain, the target file, the digital signature, and a public key associated with the cryptographic key pair.

In an embodiment, the method further comprise receiving, by the server, a record hash value associated with the target file returned by the one or more blockchain nodes.

In an embodiment, the method further comprises receiving, by the server, a query request for digest information of the target file; determining, by the server based on the identification information of the target file, whether a record hash value associated with the target file exists; if the record hash value is determined to exist, sending, by the server, the record hash value to the client; and if the record hash value is determined to not exist, sending, by the server, prompt information indicating that the target file is being uploaded to the blockchain node.

In an embodiment, the method further comprises: before the uploading, initiating, by the server to the client, a contract signing transaction for triggering an electronic signature operation on a target file transmission contract; receiving, by the server from the client, a signed version of the target file transmission contract; and uploading, by the server to the one or more blockchain nodes, the signed version of the target file transmission contract along with the target file, the digital signature, and the public key.

In an embodiment, the method further comprises: before the receiving the query request, receiving, by the server from a first transaction terminal, a file template; sending, by the server to a second transaction terminal, prompt information of whether to upload the file template to the blockchain, the prompt information carrying identification information of the file template; receiving, by the server from the second transaction terminal, a selection result indicating uploading the file template to the blockchain; in response to receiving the selection result, sending, by the server to the one or more blockchain nodes, the file template; receiving, by the server from the one or more blockchain nodes, a hash value indicating that the file template is written into the blockchain; and saving, by the server, the received hash value in a database.

In an embodiment, the method further comprises: receiving, by the server from the client, a request for joining a project, the request comprising identification information of the user and identification of the project; determining, by the server, a file template and detail information associated with the project; generating, by the server, a first target file related to the project based on the detail information associated with the project, the identification information of the user, and the file template; initiating, by the server to the client, a file signing transaction for triggering electronic signing of the first target file; receiving, by the server from the client, a second target file corresponding to a signed version of the first target file; and performing, by the server, a certification and seal operation on the second target file based on a certification authority certificate.

In an embodiment, the method further comprises: receiving, by the one or more blockchain nodes from the server, the target file, the digital signature, and the public key; validating, by the one or more blockchain nodes, the target file by: decrypting the digital signature using the public key to generate a first digital digest, hashing the target file to generate a second digital digest, and determining that the first digital digest is consistent with the second digital digest; generating, by the one or more blockchain nodes, a record hash value based on the target file; and sending, by the one or more blockchain nodes to the server, the record hash value.

In yet another aspect, a system for blockchain-based file querying is provided. The system comprises a processor and a non-transitory computer-readable storage medium storing instructions executable by the processor to cause the system to perform operations. The operations include: receiving, from a client, a query request for a target file, the query request comprising identification information of a user and identification information of the target file; obtaining, the target file based on the identification information of the user and the identification information of the target file; providing, to the client, a query page associated with the target file, the query page comprising one or more interactive elements for selecting whether to upload the target file to a blockchain; receiving, from the client, a user input selecting to upload the target file to the blockchain; in response to receiving the user input, hashing, the target file to generate a digital digest; signing, the digital digest according to an asymmetric encryption algorithm using a private key associated with a cryptographic key pair to obtain a digital signature; and uploading, to one or more blockchain nodes associated with the blockchain, the target file, the digital signature, and a public key associated with the cryptographic key pair.

In still another aspect, a non-transitory computer-readable storage medium for blockchain-based file querying is provided. The medium is configured with instructions executable by one or more processors to cause the one or more processors to perform operations. The operations include: receiving, from a client, a query request for a target file, the query request comprising identification information of a user and identification information of the target file; obtaining, the target file based on the identification information of the user and the identification information of the target file; providing, to the client, a query page associated with the target file, the query page comprising one or more interactive elements for selecting whether to upload the target file to a blockchain; receiving, from the client, a user input selecting to upload the target file to the blockchain; in response to receiving the user input, hashing, the target file to generate a digital digest; signing, the digital digest according to an asymmetric encryption algorithm using a private key associated with a cryptographic key pair to obtain a digital signature; and uploading, to one or more blockchain nodes associated with the blockchain, the target file, the digital signature, and a public key associated with the cryptographic key pair.

In the embodiments of the specification, the target file is uploaded to the blockchain node. By using the features such as decentralization, openness, and transparency of the blockchain technology, each node in the blockchain can participate in information recording. Any node has an equal right and obligation. Once being verified and added to the blockchain, information is stored permanently. Modification of a database on a single node is invalid. Therefore, by using the blockchain technology, the stability and reliability of information in the target file can be effectively improved.

DETAILED DESCRIPTION OF EMBODIMENTS

Many specific details are described below for a full understanding of the specification. However, the specification may be implemented in many ways other than those described herein, and those skilled in the art may make similar developments without departing from the essence of the specification. Therefore, the specification is not limited by the specific implementation disclosed below.

The terms used in one or more embodiments of the specification are merely used to describe the embodiments but are not intended to limit one or more embodiments of the specification. The "a" and "the" in a singular form used in one or more embodiments of the specification and the appended claims are also intended to include a plural form, unless other meanings are clearly indicated in the context. It should also be understood that, the term "and/or" used in one or more embodiments of the specification indicates and includes any or all possible combinations of one or more associated listed items.

It should be understood that although the terms "first," "second," and the like may be used to describe various information in one or more embodiments of the specification, but such information should not be limited to these terms. These terms are merely used for distinguishing information of the same type from each other. For example, without departing from the scope of one or more embodiments of the specification, the first may also be referred to as the second. Similarly, the second may also be referred to as the first. Depending on the context, the term "if" as used herein may be interpreted as "when . . . " or "upon . . . " or "in response to determining."

The terms in one or more embodiments of the specification are illustrated.

Certificate Authority (CA) is an authority responsible for distributing and managing digital certificates, and as a trusted third party in e-commerce transactions, it is responsible for validating or performing a validity check of a public key in a public key system.

An embodiment of the specification provides a service processing system based on a blockchain. The specification also relates to a service processing method and apparatus based on a blockchain, an electronic device, and a computer readable storage medium, which are described in detail in the following embodiments.

Figure 1:
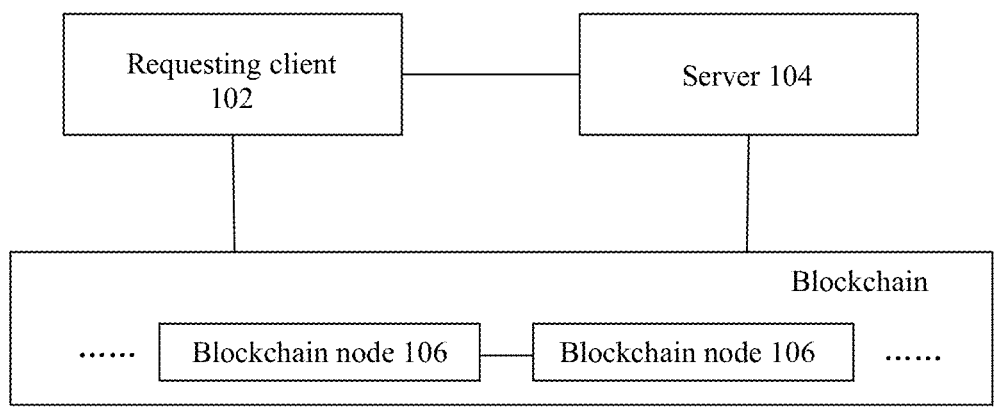
FIG. 1 is a schematic diagram of a service processing system based on a blockchain according to an embodiment of the specification.

FIG. 1 is a schematic diagram of a service processing system based on a blockchain according to an embodiment of the specification. The system includes a requesting client 102, a server 104, and at least two blockchain nodes 106 associated with the blockchain.

The requesting client 102 is configured to send a query request for a target file to the server, the query request for a target file comprising identification information of a user and identification information of the target file.

The server 104 is configured to receive the query request for a target file from the requesting client, obtain a target file based on the identification information of the user and the identification information of the target file, accept a query for a target file of the user, send, to the user, prompt information of whether to upload the target file to a blockchain node, and upload the target file to the blockchain nodes associated with the blockchain if a request for uploading a target file of the user is received.

The blockchain node 106 is configured to receive the target file, store the target file, and return a corresponding record hash value to the requesting client.

In an embodiment of the specification, the server is further configured to: hash the target file according to a preset algorithm to generate a corresponding digital digest; sign the digital digest with a private key associated with a cryptographic key pair by using an asymmetric encryption algorithm to generate a corresponding digital signature; and upload a public key associated with the cryptographic key pair, the target file, and the digital signature to the blockchain node.

The blockchain node is further configured to: receive the public key, the target file, and the digital signature; perform a validity check on the target file according to the public key and the digital signature; and after the validity check of the target file succeeds, store the digital digest that is generated by hashing the target file according to the preset algorithm, and return the corresponding record hash value associated with the target file to the server.

The server is further configured to: provide a query page for a target file for the user, the query page for a target file comprising one or more interactive elements for selecting whether to upload the target file to a blockchain, such as a prompt box for prompting whether to upload the target file to the blockchain node and being configured to comprise an option button clickable by the user; detect a selection result of the user; and upload the target file to the blockchain node if the selection result of the user is confirming to upload.

In an embodiment provided in the specification, the requesting client is further configured to: send a query request for digest information of the target file to the blockchain node, the query request for digest information of the target file comprising the record hash value.

The blockchain node is further configured to receive the query request for digest information of the target file, obtain file digest information of the target file and a download address of the target file according to the record hash value; and send the digest information of the target file and the download address of the target file to the requesting client.

The requesting client is further configured to receive the digest information of the target file and the download address of the target file, and download the target file according to the download address of the target file.

The blockchain node is further configured to: decrypt the digital signature by using the public key to generate a first digital digest; hash the target file according to the preset algorithm to generate a second digital digest; compare whether the first digital digest is consistent with the second digital digest; if the first digital digest is consistent with the second digital digest, determine that the validity check of the target file succeeds; if the first digital digest is inconsistent with the second digital digest, send, to the server, prompt information indicating that the validity check fails.

In addition, the requesting client is further configured to: send a query request for digest information of the target file to the server, the query request for digest information of the target file carrying the identification information of the target file.

The server is further configured to: receive the query request for digest information of the target file; determine, according to the identification information of the target file, whether a record hash value associated with the target file (i.e., the corresponding record hash value) exists; and if the corresponding record hash value exists, send the record hash value to the requesting client.

The requesting client is further configured to receive the record hash value.

In an embodiment, the server is further configured to: if it is determined, according to the identification information of the target file, that the corresponding record hash value does not exist, send, to the requesting client, prompt information indicating that information (including the target file) is being uploaded to the blockchain node.

In an embodiment provided in the specification, the blockchain node is further configured to: after the validity check of the target file succeeds, return, to the server and the requesting client respectively, a call result indicating that the digital digest of the target file has been received successfully; and after the digital digest of the target file is stored, return the corresponding record hash value to the server.

In an embodiment provided in the specification, the requesting client is further configured to: receive a contract signing transaction initiated by the server, the contract signing transaction being used for triggering an electronic signature operation on a target file transmission contract; perform an electronic signature operation in response to the contract signing transaction; and send a signed version of the target file transmission contract to the server.

The server is further configured to receive the signed version of the target file transmission contract sent by the requesting client, and send, to the blockchain node, the signed version of the target file transmission contract, the target file, the public key, and the digital signature that is obtained by hashing the target file.

In an embodiment, the service processing system based on a blockchain further includes: a first transaction terminal and a second transaction terminal.

The first transaction terminal is configured to upload a file template to the server.

The server is further configured to receive the file template, and send, to the second transaction terminal, prompt information of whether to upload the file template to the blockchain nodes of the blockchain, the prompt information carrying identification information of the file template.

The second transaction terminal is configured to receive the prompt information, determine a selection result based on the prompt information, and send information carrying the selection result to the server.

The server is further configured to receive the information that is sent by the second transaction terminal and that carries the selection result, and send the file template to the blockchain nodes of the blockchain if the selection result carried in the information is confirming to upload.

The blockchain node is further configured to receive the file template, store the file template, return a hash value indicating that the file template is written into the blockchain successfully, and send the hash value to the server.

The server is configured to receive the hash value and save the hash value in a database.

In an embodiment provided in the specification, the requesting client is further configured to send a request for joining a project to the server, the request for joining a project carrying the identification information of the user and identification information of the project.

the server is further configured to receive the request for joining a project; determine, according to the identification information of the project, a file template and detail information of the project associated with the project; generate a first target file related to the project according to the detail information of the project, the identification information of the user, and the file template; and initiate a file signing transaction to the requesting client, the file signing transaction being used for triggering electronical signing of the first target file;

The requesting client is further configured to receive the file signing transaction initiated by the server, perform an electronic signature operation on the first target file in response to the file signing transaction, and send a second target file corresponding to the signed version of the target file to the server.

The server is further configured to: receive the second target file, and perform a certification and seal operation on the second target file based on a certificate authority certificate.

The certificate authority is an e-commerce certificate authority, that is, a CA seal operation is performed on the second target file based on the CA certificate.

In an embodiment provided in the specification, the blockchain technology is suitable for depository of the target file because the blockchain has characteristics of tampering-proofing and the like. Sharing of depository information of the target file is implemented by using a consortium blockchain comprising institutions such as a judiciary, a court, or a notary office. Once being written into the blockchain, the depository information of the target file is automatically synchronized to a data server in the notary office, and each node of the blockchain saves all the depository information of the target file, thereby ensuring that none of the nodes can modify the data randomly. When a dispute over the target file occurs between the user and the server, the authenticity of the target file can be verified in the notary office, thereby preventing the target file from being tempered and improving the credibility of the target file.

Figure 2:
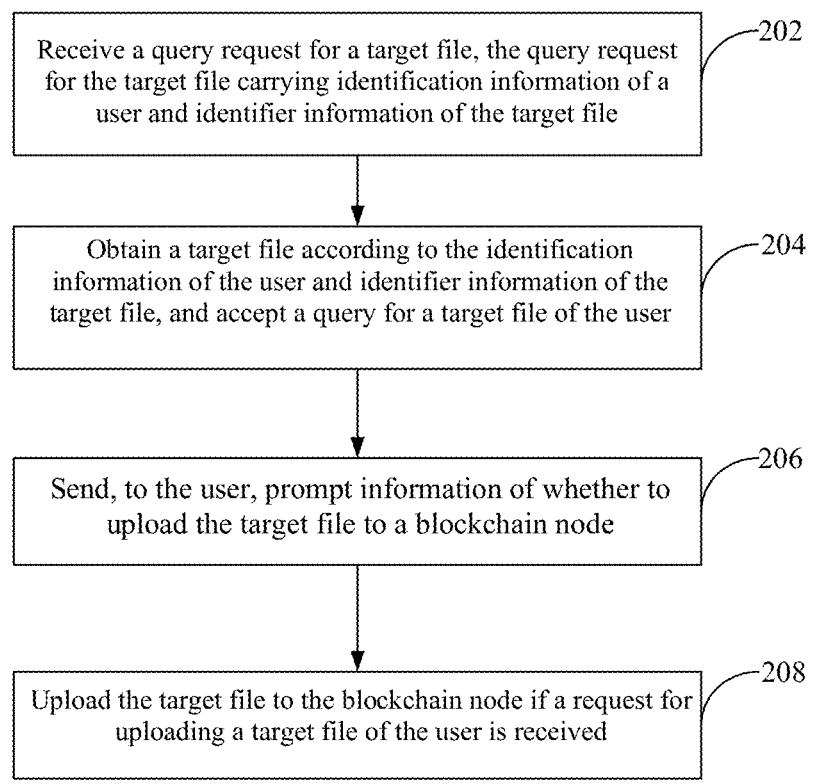
FIG. 2 is a flowchart of a service processing method based on a blockchain according to an embodiment of the specification.

FIG. 2 is a flowchart of a service processing method based on a blockchain according to an embodiment of the specification. The method includes step 202 to step 208.

Step 202: receive a query request for a target file, the query request for a target file carrying identification information of a user and identification information of the target file.

In an embodiment provided in the specification, before the query request for a target file is received, a first transaction terminal sends an initial file template related to a project that is sent to the server. For example, the project may include an insurance project, a financial project, a mutual aid project, a public welfare project, a medical project, or a life service project. After receiving the initial file template, the server sends, to a second transaction terminal, prompt information of whether to upload the initial file template to the blockchain, the prompt information carrying identification information of the file template. If a determined upload instruction sent by the second transaction terminal is received, the server uploads the initial file template to the blockchain node, receives a hash value that is returned by the blockchain node and that is generated by storing the initial file template, and saves the hash value in a database.

In an embodiment, after the server uploads the initial file template to the blockchain, if the initial template needs to be improved, an improved version of the initial template is re-uploaded to the blockchain node, and a corresponding hash value returned by the blockchain node is saved.

In an embodiment provided in the specification, the server presents project details for the user through a page. If the user intends to join the project, the user and a project organizer sign jointly to generate the target file.

A process of generating the target file may be implemented through the following steps.

The requesting client sends a request for joining a project to the server, the request for joining a project carrying identification information of the user and identification information of the project.

The server receives the request for joining a project, determines, according to the identification information of the project, a file template and detail information of the project that are associated with the project, generates a first target file related to the project according to the detail information of the project and the file template, and initiates a file signing transaction to the requesting client, wherein the file signing transaction is used for triggering electronical signing of the first target file.

The requesting client receives the file signing transaction initiated by the server, performs an electronic signature operation on the first target file in response to the file signing transaction, and sends a second target file corresponding to a signed version of the target file to the server. The server receives the second target file, and performs a CA seal operation on the second target file based on a CA certificate to generate the target file.

In an embodiment, the server sends one or more target files that are generated within a preset duration to the second transaction terminal, to obtain authority seals for the one or more target files. The second transaction terminal may be a project agent. The second transaction terminal sends the sealed files to the server through batch processing. The server stores the files.

Using an insurance project as an example, the user sends a request for an insurance participation to an insurance company, wherein the request for the insurance participation carries the identification of the user and identification information of the insurance type, such that the identification information of the user includes the name, age, gender, and ID card information of the user, and identification information of the insurance type is a health insurance type A. The insurance company receives the request for the insurance participation, determines, according to the identification information of the insurance type, an insurance policy template, and detail information of the insurance type that are associated with the insurance type, and generates a first insurance policy related to the insurance type according to the detail information of the insurance type, the identification information of the user, and the insurance policy template. The first insurance policy is generated by filling the identification information of the user and the detail information of the insurance type into the insurance policy template.

After the first insurance policy is generated, the insurance company initiates an insurance policy signing transaction to the user, wherein the insurance policy signing transaction is used for triggering the user to electronically sign the first insurance policy. After receiving the insurance policy signing transaction, the user performs an electronic signature operation on the first insurance policy, and sends a second insurance policy corresponding to a signed version of the first insurance policy to the insurance company. The insurance company receives the second insurance policy, and performs a CA seal operation on the second insurance policy based on a CA certificate to generate a final target insurance policy.

In an embodiment provided in the specification, after the target file is signed successfully, if the user does not save the file, the user may send a query request for a target file to the server, the query request for a target file carrying the identification information of the user and the identification information of the target file.

Step 204: obtain a target file according to the identification information of the user and the identification information of the target file, and accept a query for a target file of the user.

In an embodiment provided in the specification, after receiving the query request for a target file, the server queries files related to the user in a database according to the identification information of the user, and then queries the target file in the files related to the user according to the identification information of the target file.

In an embodiment, if the server does not find any file related to the user in the database according to the identification information of the user, the server presents an interface of product detail of a project to the user.

Step 206: send, to the user, prompt information of whether to upload the target file to a blockchain node.

Specifically, if the server finds the target file in the files related to the user according to the identification information of the target file, a query page for a target file (i.e., a query page associated with the target file) is provided to the user. The query page for a target file is configured to comprise a prompt box for prompting whether to upload the target file to the blockchain node, and the prompt box is configured to comprise an option button clickable by the user. The server detects a selection result of the user in the prompt box, and performs a subsequent operation according to the selection result.

Figure 3:
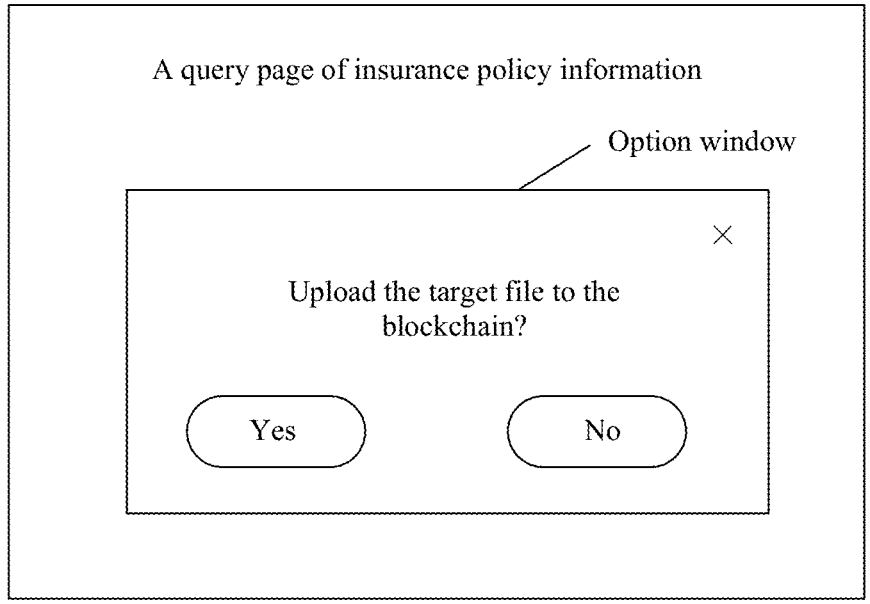
FIG. 3 is a schematic diagram of a query page of an insurance policy information in a service processing method based on a blockchain according to an embodiment of the specification.

For example, the project that the user joins is an insurance project, the server is an insurance company, and the target file is insurance policy information. A query page for an insurance policy information provided by the insurance company for the user is shown in FIG. 3. If it is detected that the user is currently viewing the target file, an option window pops up in an interaction interface, to prompt the user to select a corresponding icon to perform the next operation. As shown in FIG. 3, content in the option window that pops up is "upload the target file to the blockchain?" Moreover, two click buttons are provided, which are "yes" and "no" respectively. If it is detected that the button clicked by the user is "yes", the insurance policy information is uploaded to the blockchain node.

In an embodiment, the prompt box for prompting whether to upload the target file to the blockchain node may also be provided in an interface for query of asset. Using a financial project as an example, after the user purchases a financial product, if it is detected that the user is currently viewing details of the purchased financial product, the prompt box for prompting whether to upload the target file to the blockchain node may pop up. In addition, a selection result of the user in the prompt box is detected, and a subsequent operation is performed according to the selection result of the user.

Step 208: upload the target file to the blockchain node if a request for uploading a target file of the user is received.

If the selection result of the user is confirming to upload, the target file is uploaded to the blockchain node.

In an embodiment, after receiving the request for uploading a target file of the user, the server initiates a contract signing transaction to the user, wherein the contract signing transaction is used for triggering an electronic signature operation on a target file transmission contract. The user receives the contract signing transaction initiated by the server, executes an electronic signature program in response to the contract signing transaction, and sends the signed target file transmission contract to the server.

The server receives the signed target file transmission contract sent by the user, and sends, to the blockchain node, the target file transmission contract, the target file, and digital signature that is generated by hashing the target file. In addition, the information sent by the server to the blockchain node further includes a signing time of the target file and a hash value that corresponds to a file template associated with the project.

When the project that the user joins is an insurance project, after receiving a request for uploading an insurance policy file of the user, the insurance company and the user jointly sign a user-blockchain main contract. After the contract is signed successfully, the insurance company sends, to the blockchain node, the insurance policy file and the digital signature that is generated by hashing the insurance policy file. In addition, the information sent by the insurance company to the blockchain node further includes a signing time of the insurance policy file, a main contract jointly signed by the user and the insurance company, and a hash value corresponding to the insurance policy template of the insurance policy signed by the user.

After the server uploads the initial file template to the blockchain, if the initial template needs to be improved, the improved version of the template is re-uploaded to the blockchain node, and a corresponding hash value returned by the blockchain node is saved. Therefore, the server uploads, to the blockchain, the hash value corresponding to the insurance policy template of the insurance policy signed with the user and the insurance policy file, so that user can trace the version of the insurance policy template while subsequently querying insurance policy information, thereby bringing better service experience to the user.

In an embodiment provided in the specification, the blockchain technology may be also referred to as a distributed ledger technology, which is a new technology that a plurality of devices jointly participates in "accounting" to maintain an integrated distributed database together. The blockchain technology has the following characteristics: decentralization, openness, and transparency, each device can participate in database recording, and data can be quickly synchronized among devices. Therefore, the blockchain technology has been widely applied in many fields. The blockchain nodes in the embodiments of the specification include a service related device institution node of the blockchain, a service device of an Internet platform, a device of a regulatory agency, a service device of the requesting client, a service device of a notary office, a service device of a court, or a service device of a judicial expertise center.

The uploading the target file to the blockchain node may be implemented through the following steps: hashing the target file according to a preset algorithm to generate a corresponding digital digest; and signing the digital digest with a private key by using an asymmetric encryption algorithm to generate a corresponding digital signature; and uploading a public key, the digital signature, and the target file to the blockchain node.

After receiving the public key, the target file, and the digital signature, the blockchain node further needs to perform a validity check on the target file. The validity check of the target file may be implemented through the following steps: decrypting the digital signature by using the public key to generate a first digital digest; hashing the target file according to the preset algorithm to generate a second digital digest; comparing whether the first digital digest is consistent with the second digital digest; if the first digital digest is consistent with the second digital digest, determining that the validity check of the target file succeeds; if the first digital digest is inconsistent with the second digital digest, sending, to the server, prompt information indicating that the validity check fails.

After the validity check of the target file succeeds, the blockchain node stores the digital digest that is generated by hashing the target file according to the preset algorithm, and returns a corresponding record hash value to the server.

In an embodiment provided in the specification, after signing the target file transmission contract, the user may send a query request for digest information of the target file to the server. The server receives the query request for digest information of the target file, determines whether the corresponding record hash value exists according to the identification information of the target file, and if the corresponding record hash value exists, sends the record hash value to the requesting client; if the corresponding record hash value does not exist, sends, to the requesting client, prompt information indicating that information is being uploaded to the blockchain node.

After receiving the record hash value, the requesting client sends the query request for digest information of the target file to the blockchain node, wherein the query request for digest information of the target file carries the record hash value. The blockchain node receives the query request for digest information of the target file, obtains digest information of the target file and a download address of the target file according to the record hash value, and sends the digest information of the target file and the download address of the target file to the requesting client. The requesting client receives the digest information of the target file and the download address of the target file, and downloads the target file according to the download address of the target file.

Figure 4:
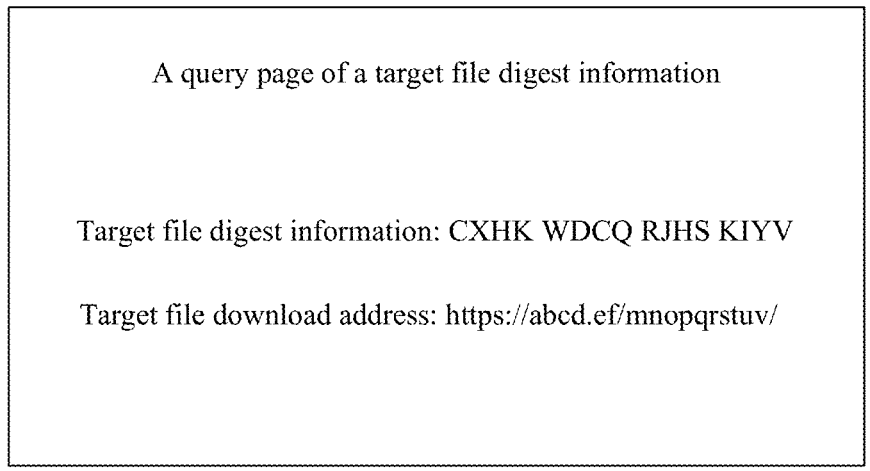
FIG. 4 is a schematic diagram of a query page of a target file digest information in a service processing method based on a blockchain according to an embodiment of the specification.

In actual application, the blockchain node provides a query page of a target file digest information for the user. Specifically, a schematic diagram of the query page of the target file digest information provided by the blockchain node for the user is shown in FIG. 4. If it is detected that the user clicks the record hash value, a query page of information (including the target file) pops up in the interaction interface. The page displays the digest information of the target file and the download address of the target file. If it is monitored that the user clicks the download address of the target file, the target file is downloaded for the user.

In the embodiment of the specification, the target file in the blockchain may be stored in a local storage space, or in another storage space out of the blockchain, which is not limited herein. In addition, in the embodiment of the specification in FIG. 4, the digest information of the target file is CXHK WDCQ RJHS KIYV and the download address of the target file is https://abcd.ef/mnopqrstuv/. The digest information of the target file and the specific download address of the target file are determined according to actual applications, which are not limited herein.

Using the insurance project as an example, the blockchain node provides a query page of insurance policy digest information for the user. After the digital digest that is generated by hashing the target file according to the preset algorithm is stored, the corresponding record hash value is displayed on the interaction interface. The user can obtain the file digest information of the insurance policy file and the download address of the insurance policy file by clicking the record hash value displayed on the interaction interface. The user can choose whether to download the insurance policy file autonomously.

In an embodiment provided in the specification, because the blockchain uses distributed accounting and storage, there is no centralized hardware or management institution. Moreover, the digital digest of the target file is stored on the judicial blockchain, and the mathematical principle of a digital digest algorithm ensures that the target file cannot be restored reversely according to the digital digest. Therefore, the privacy of the user is protected. The target file is transparent and tamper-proof while the privacy of the user is ensured. Moreover, the user can download the target file according to the download address of the target file provided by the blockchain node, so that the user can obtain the target file more conveniently.

Figure 5:
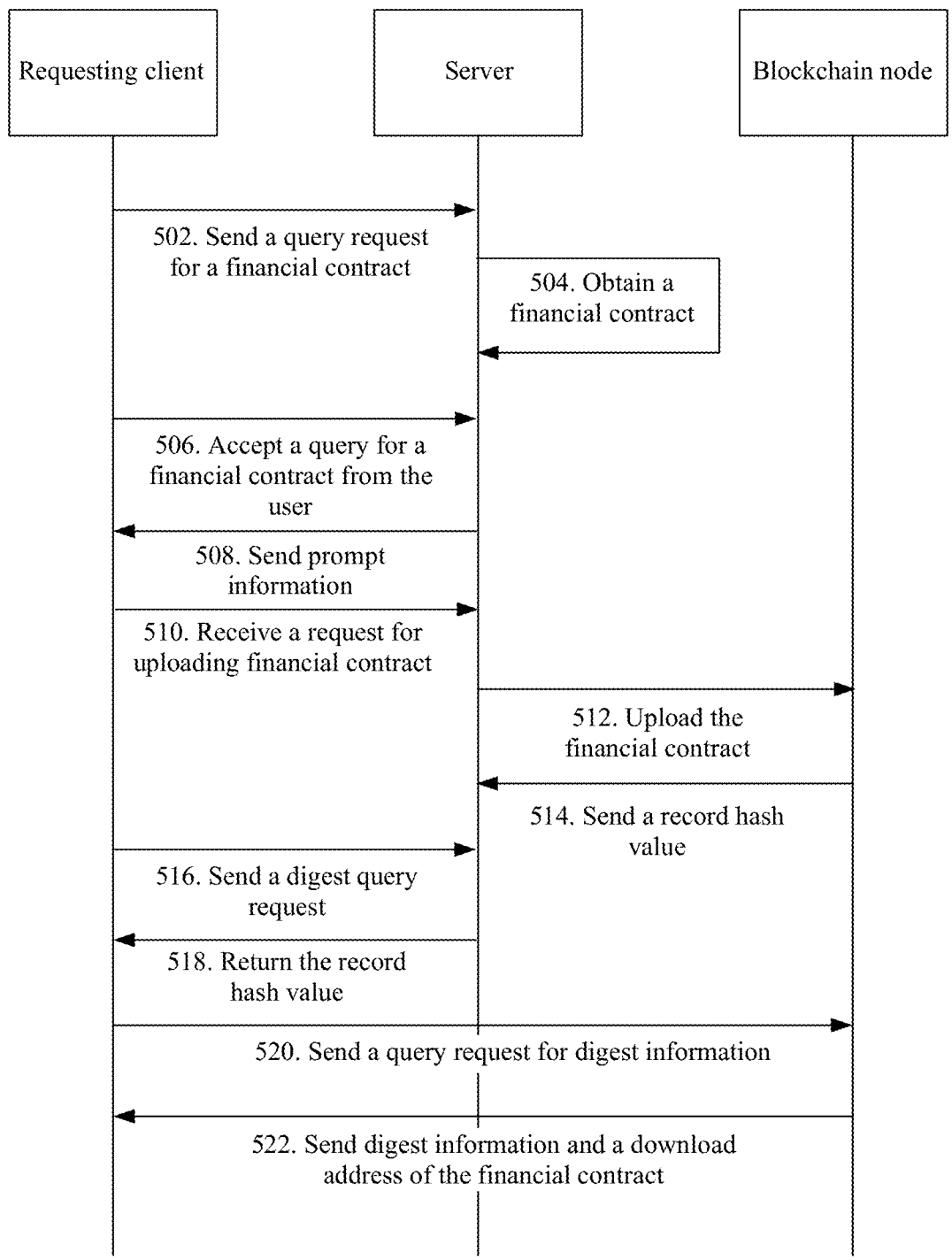
FIG. 5 is a schematic diagram of interaction of a service processing method based on a blockchain according to an embodiment of the specification.

FIG. 5 is a schematic diagram of interaction of a service processing method based on a blockchain according to an embodiment of the specification. The service processing method based on a blockchain is described by using a financial project as an example, and includes step 502 to step 522.

Step 502: a requesting client sends a query request for a financial contract to a server.

In an embodiment provided in the specification, the query request for a financial contract carries identification information of a user and identification information of a financial contract.

In an embodiment, before the query request for a financial contract is received, a first transaction terminal or a contract template generating end sends an initial financial contract template related to a financial product to a financial institution. After receiving the initial financial contract template, the financial institution sends, to a second transaction terminal, that is, a financial project agent, prompt information of whether to upload the initial financial contract template to the blockchain, wherein the prompt information carries identification information of the initial financial contract template. If a determined upload instruction sent by the financial project agent is received, the financial institution uploads the initial financial contract template to a blockchain node. A hash value that is returned by the blockchain node and that is generated by storing the initial financial contract template is received, and the hash value is saved in a database.

In addition, after the server uploads the initial file template to the blockchain, if the initial file template needs to be improved, an improved version of the file template is re-uploaded to the blockchain node, and a corresponding hash value corresponding to the improved version of the file template returned by the blockchain node is saved.

The financial institution displays financial product details for the user through a page. If the user intends to buy the financial product, the user and the financial project agent sign the financial contract jointly.

In an embodiment, the financial institution sends one or more financial contracts generated in a preset duration to the financial project agent to obtain an authority seal. The financial project agent sends the sealed financial contracts to the financial institution through batch processing. The financial institution stores the received sealed financial contracts.

For example, when the preset duration is one workday, the financial institution sends M financial contracts generated within one workday to the financial project agent to obtain an authority seal, wherein M is an integer greater than or equal to 0. After the financial project agent sends the sealed M financial contracts to the financial institution, the financial institution stores the received M sealed financial contracts.

Still using the financial project as an example, the user sends a purchase request of a financial product to the financial institution, wherein the purchase request of a financial product carries the identification information of the user and identification information of the financial product. The identification information of the user may include the name, age, gender, and ID card information of the user, and the identification information of the financial product is product B. The financial institution receives the purchase request of a financial product, determines, according to the identification information of the financial product, a financial contract template and financial product detail information that are associated with the financial product, and generates a first financial contract related to the type of the financial product according to the financial product detail information, the identification information of the user, and the financial contract template. The first financial contract is generated by filling the identification information of the user and the financial product detail information into the financial contract template.

After the first financial contract is generated, the financial institution initiates a financial contract signing transaction to the user, wherein the financial contract signing transaction is used for triggering the user to electronically sign the first financial contract. The user receives the financial contract signing transaction, performs an electronic signature operation on the first financial contract, and sends a second financial contract corresponding to the signed version of the first financial contract to the financial institution. The financial institution receives the second financial contract, and performs a CA seal operation on the second financial contract to generate a final sealed financial contract based on a CA certificate.

In an embodiment provided in the specification, after the financial contract is signed successfully, if the user does not save the contract, the user may send a query request for the financial contract to the financial institution, wherein the query request for the financial contract carries the identification information of the user and the identification information of the financial contract.

Step 504: the server receives the query request of the financial contract, and obtains the financial contract.

In an embodiment provided in the specification, after receiving the financial contract query request, the financial institution queries contracts related to the user in the database according to the identification information of the user, and then queries the financial contract in the contracts related to the user according to the identification information of the financial contract.

In an embodiment, if the financial institution does not find any contract related to the user in the database according to the identification information of the user, the financial institution displays an interface of financial product details to the user.

Step 506: accepts a query for a financial contract from the user.

Step 508: the server sends, to the user, prompt information of whether to upload the financial contract to a blockchain node.

Step 510: the server receives a request for uploading financial contract sent by the user.

If the financial institution finds the financial contract in the files related to the user according to the identification information of the financial contract, a query page of the financial contract is provided for the user. The query page of the financial contract is configured to comprise a prompt box for prompting whether to upload the financial contract to the blockchain node, and the prompt box is configured to comprise an option button clickable by the user. The financial institution detects a selection result of the user in the prompt box, and performs a subsequent operation according to the selection result.

Step 512: the server uploads the financial contract to the blockchain node.

If the selection result of the user is confirming to upload, the target file is uploaded to the blockchain node.

In an embodiment, after receiving the request for uploading financial contract of the user, the financial institution initiates a contract signing transaction to the user, wherein the contract signing transaction is used for triggering an electronic signature operation on a financial contract transmission pact. The user receives the contract signing transaction initiated by the financial institution, executes an electronic signature program to respond to the contract signing transaction, and sends the signed financial contract transmission pact to the financial institution.

The financial institution receives the signed financial contract transmission pact sent by the user, and sends, to the blockchain node, the financial contract transmission pact, the financial contract, and the digital signature that is generated by hashing the financial contract. In addition, the information sent by the financial institution to the blockchain node further includes a signing time of the financial contract and a hash value that corresponds to the financial contract template related to the financial product.

The uploading the target file to the blockchain node may be implemented through the following steps: hashing the target file according to a preset algorithm to generate a corresponding digital digest; and signing the digital digest with a private key by using an asymmetric encryption algorithm to generate a corresponding digital signature; and uploading a public key, the digital signature, and the target file to the blockchain node.

After receiving the public key, the target file, and the digital signature, the blockchain node further performs a validity check on the target file. The validity check of the target file may be implemented through the following steps: decrypting the digital signature by using the public key to generate a first digital digest; hashing the target file according to the preset algorithm to generate a second digital digest; comparing whether the first digital digest is consistent with the second digital digest; if the first digital digest is consistent with the second digital digest, determining that the validity check of the target file succeeds; if the first digital digest is inconsistent with the second digital digest, sending, to the server, prompt information indicating that the validity check fails.

After the validity check of the target file succeeds, the blockchain node stores the digital digest that is generated by hashing the target file according to the preset algorithm, and returns a corresponding record hash value to the server.

In an embodiment, after receiving the target file, the blockchain node performs a validity check on the target file. After the validity check of the target file succeeds, the blockchain node returns, to the server and the requesting client respectively, a call result indicating that the digital digest of the target file has been received successfully, and after the digital digest of the target file is stored, returns the corresponding record hash value to the server.

Step 514: the blockchain node returns a record hash value to the server.

Step 516: the requesting client sends a digest query request to the server.

Step 518: the server returns the record hash value to the requesting client.

In an embodiment provided in the specification, after signing the target file transmission contract, the user may send a query request for digest information of the target file to the server. The server receives the query request for digest information of the target file, determines whether the corresponding record hash value exists according to the identification information of the target file, and if the corresponding record hash value exists, sends the record hash value to the requesting client.

If it is determined, according to the identification information of the target file, that the corresponding record hash value does not exist, prompt information indicating that information is being uploaded to the blockchain node is sent to the requesting client.

Step 520: the requesting client sends a query request for digest information to the blockchain node.

Step 522: the blockchain node sends digest information and a download address of the financial contract to the requesting client.

In an embodiment provided in the specification, after receiving the record hash value, the requesting client sends the query request for digest information of the target file to the blockchain node, wherein the query request for digest information of the target file carries the record hash value. The blockchain node receives the query request for digest information of the target file, obtains file digest information of the target file and the download address of the target file according to the record hash value, and sends the digest information of the target file and the download address of the target file to the requesting client. The requesting client receives the digest information of the target file and the download address of the target file, and downloads the target file according to the download address of the target file.

In an embodiment provided in the specification, because the blockchain uses distributed accounting and storage, there is no centralized hardware or management institution. Moreover, the digital digest of the financial contract is stored on the judicial blockchain, and the mathematical principle of a digital digest algorithm ensures that the financial contract cannot be restored reversely according to the digital digest. Therefore, the privacy of the user is protected, and the financial contract is tamper proofed. Moreover, the user can download the financial contract according to the contract download address provided by the blockchain node, so that the user can obtain the financial contract more conveniently.

Figure 6:
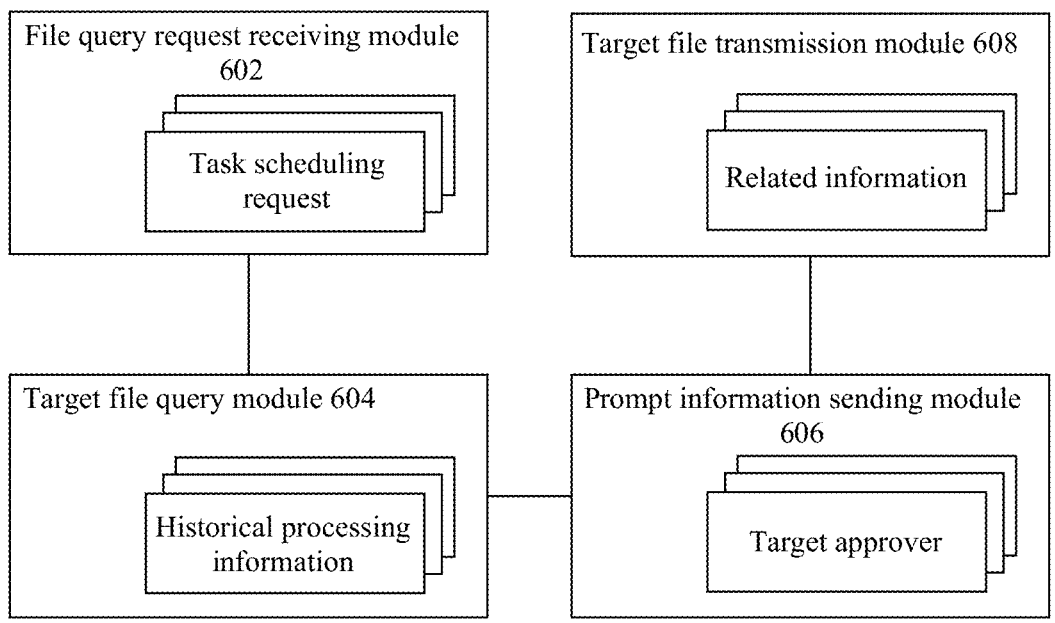
FIG. 6 is a schematic structural diagram of a service processing apparatus based on a blockchain according to an embodiment of the specification.

Corresponding to the foregoing method embodiment, the specification further provides an embodiment of a service processing apparatus based on a blockchain. FIG. 6 is a schematic structural diagram of a service processing apparatus based on a blockchain according to an embodiment of the specification. As shown in FIG. 6, the apparatus includes a file query request receiving module 602, a target file query module 604, a prompt information sending module 606, and a target file transmission module 608.

The file query request receiving module 602 is configured to receive a query request for a target file, the query request for a target file carrying identification information of a user and identification information of the target file.

The target file query module 604 is configured to obtain a target file according to the identification information of the user and the identification information of the target file, and accept a query for the target file of the user.

The prompt information sending module 606 is configured to send, to the user, prompt information of whether to upload the target file to the blockchain node.

The target file transmission module 608 is configured to upload the target file to the blockchain node if a request for uploading a target file of the user is received.

The target file transmission module is further configured to: hash the target file according to a preset algorithm to generate a corresponding digital digest; sign the digital digest with a private key by using an asymmetric encryption algorithm to generate a corresponding digital signature; and upload a public key, the digital signature, and the target file to the blockchain node.

In an embodiment, the service processing apparatus based on a blockchain further includes a record hash value receiving module, configured to receive a record hash value returned by the blockchain node.

In an embodiment, the prompt information sending module is further configured to: provide a query page for a target file for the user, the query page for a target file being configured to comprise a prompt box for prompting whether to upload the target file to the blockchain node, and the prompt box being configured to comprise an option button clickable by the user; and detect a selection result of the user.

The target file transmission module is further configured to upload the target file to the blockchain node if the selection result of the user is confirming to upload.

In an embodiment, the service processing apparatus based on a blockchain further includes a query request for digest information of the target file receiving module, configured to: receive the query request for digest information of the target file; determine, according to the identification information of the target file, whether the corresponding record hash value exists; if the corresponding record hash value exists, send the record hash value to the requesting client; and if the corresponding record hash value does not exist, send, to the requesting client, prompt information indicating that information is being uploaded to the blockchain node.

In an embodiment, the target file transmission module is further configured to: initiate a contract signing transaction to the user if the request for uploading a target file of the user is received, the contract signing transaction being used for triggering an electronic signature operation on a target file transmission contract; and receive a signed version of the target file transmission contract sent by the user, and send, to the blockchain node, the signed version of the target file transmission contract, the target file, and the digital signature that is generated by hashing the target file.

In an embodiment, the service processing apparatus based on a blockchain further includes: a file template transmission prompt information sending module, configured to receive a file template, and send, to the second transaction terminal, prompt information of whether to upload the file template to the blockchain node, the prompt information carrying identification information of the file template; a selection result receiving module, configured to receive information that is sent by the second transaction terminal and that carries the selection result, and send the file template to the blockchain node when the selection result carried in the information is confirming to upload; and a storage module, configured to receive a hash value, which is returned by the blockchain node, indicating that the file template is written into the blockchain successfully, and save the hash value in a database.

In an embodiment provided in the specification, the blockchain technology is suitable for depository of the target file because the blockchain has characteristics of tampering proofing and the like. Sharing of depository information of the target file is implemented by using a consortium blockchain comprising institutions such as a judiciary, a court, or a notary office. Once being written into the blockchain, the depository information of the target file is automatically synchronized to a data server in the notary office. Each node of the blockchain saves all the depository information of the target file, thereby ensuring that none of the blockchain nodes can modify data randomly. When a dispute over the target file occurs between the user and the server, the authenticity of the target file can be verified by the notary office, thereby preventing the target file from being tempered, and improving the credibility of the target file.

Figure 7:
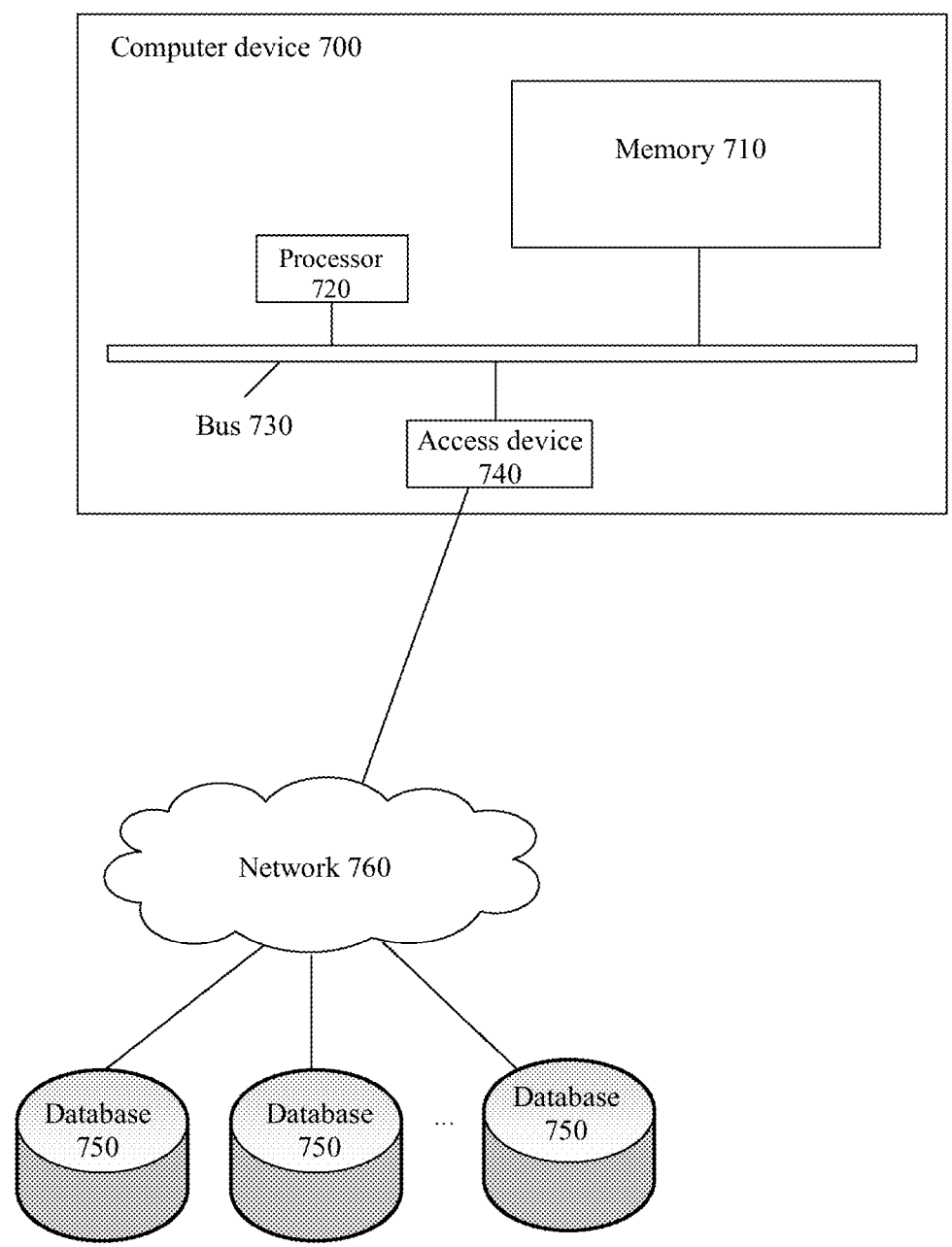
FIG. 7 is a structural block diagram of an electronic device according to an embodiment of the specification.

FIG. 7 is a structural block diagram of an electronic device 700 according to an embodiment of the specification. Components of the electronic device 700 include, but are not limited to, a memory 710 and a processor 720. The processor 720 is connected to the memory 710 through a bus 730, and a database 750 is configured to save data.

The electronic device 700 further includes an access device 740. The access device 740 enables the electronic device 700 to communicate through one or more networks 760. Examples of the networks include a public switched telephone network (PSTN), a local area network (LAN), a wide area network (WAN), a personal area network (PAN), or a combination of communications networks such as the Internet. The access device 740 may include one or more of any type of wired or wireless network interfaces (for example, a network interface card (NIC)), for example, an IEEE802.11 wireless local area network (WLAN) wireless interface, a Worldwide Interoperability for Microwave Access (Wi-Max) interface, an Ethernet interface, a Universal Serial Bus (USB) interface, a cellular network interface, a Bluetooth interface, a near-field communication (NFC) interface, and the like.

In one or more embodiments of the specification, the foregoing components of the electronic device 700 and other components not shown in FIG. 7 may also be connected to each other, for example, through a bus. It should be appreciated that, the structural block diagram of the electronic device shown in FIG. 7 is merely for an illustrative purpose, but does not limit the scope of the specification. A person skilled in the art may add or replace other components as required.

The electronic device 700 may be any type of stationary or mobile electronic device, including a mobile computer or a mobile electronic device (for example, a tablet computer, a personal digital assistant, a laptop computer, a notebook computer, and a netbook), a mobile phone (for example, a smart phone), a wearable electronic device (for example, a smart watch, and smart glasses) or other types of mobile devices, or a stationary electronic device such as a desktop computer or a PC. The electronic device 700 may alternatively be a mobile or stationary server.

The processor 720 is configured to execute the instructions. The instructions, when being executed by the processor, implements the steps of the foregoing service processing method based on a blockchain.

Described above is a schematic solution of an electronic device in this embodiment. It should be noted that, the technical solution of the electronic device belongs to the same conception as the technical solution of the foregoing service processing method based on a blockchain. For content not described in detail in the technical solution of the electronic device, reference may be made to the description of the technical solution of the foregoing service processing method based on a blockchain.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

An embodiment of the specification further provides a computer readable storage medium, which stores computer instructions. The instructions, when being executed by the processor, implements the steps of the foregoing service processing method based on a blockchain.

Described above is a schematic solution of a computer readable storage medium in this embodiment. It should be noted that, the technical solution of the storage medium belongs to the same conception as the technical solution of the foregoing service processing method based on a blockchain. For content not described in detail in the technical solution of the storage medium, reference may be made to the description of the technical solution of the foregoing service processing method based on a blockchain.

Specific embodiments of the specification are described above. Other embodiments are in the scope of the appended claims. In some cases, the actions or steps described in the claims may be performed in a sequence different from the sequence in the embodiment, and can still achieve the expected result. In addition, the process described in the drawings does not necessarily require the illustrated specific sequence or a successive sequence to achieve the expected result. In some embodiments, multi-task processing and parallel processing are feasible or may be beneficial.

The computer instructions include computer program code, and the computer program code may be in a source code form, an object code form, an executable file, or some intermediate forms. The computer-readable medium may include: any entity or device capable of carrying the computer program code, a recording medium, a USB flash drive, a removable hard disk, a magnetic disk, an optical disc, a computer memory, a read-only memory (ROM), a random access memory (RAM), electric carrier signals, telecommunication signals, software distribution media, and the like. It should be noted that, the content contained in the computer-readable medium may be appropriately added or reduced according to the requirements of legislation and patent practice in the jurisdictions. For example, in some jurisdictions, the computer-readable medium does not include electric carrier signals and telecommunication signals.

It should be noted that, for brief description, the foregoing method embodiments are represented as a series of actions. However, persons skilled in the art should appreciate that the specification is not limited to the described order of the actions, because according to the specification, some steps may be performed in other orders or simultaneously. It should be further appreciated by persons skilled in the art that the embodiments described in the specification all belong to some embodiments, and the actions and modules are not necessarily required by the specification.

In the foregoing embodiments, the description of each embodiment has respective focuses. For a part that is not described in detail in an embodiment, reference may be made to related descriptions in other embodiments.

The embodiments of the specification disclosed above are only used to help explain the specification. The optional embodiments do not describe all the details, and are not intended to limit the specification to the specific implementations described. Many modifications and changes may be made according to the content of the specification. These embodiments are selected and described in the specification for better explaining the principles and practical applications of the specification, so that those skilled in the art can better understand and use the specification. The specification is limited only by the claims and full scope and equivalents thereof

The invention claimed is:

1. A computer-implemented method, comprising:
   receiving, by a server from a client, a request for joining a project;
   determining, by the server, a file template and detail information associated with the project;
   generating, by the server, a first file related to the project based on the detail information associated with the project and the file template;
   initiating, by the server to the client, a file signing transaction for triggering electronic signing of the first file;
   receiving, by the server from the client, a second file corresponding to a signed version of the first file;
   performing, by the server, a certification authority seal operation on the second file based on a certification authority certificate to generate a target file;
   receiving, by the server from the client, a user input selecting to upload the target file to a blockchain; and
   uploading, by the server to one or more blockchain nodes associated with the blockchain, the target file.

2. The method of claim 1, further comprising:
   receiving, by the server from the client, a query request for the target file, the query request comprising identification information of the target file; and
   obtaining, by the server, the target file based on the identification information of the target file.

3. The method of claim 1, further comprising:
   receiving, by the server, a record hash value associated with the target file returned by the one or more blockchain nodes.

4. The method of claim 1, further comprising:
   receiving, by the server, a query request for digest information of the target file;
   determining, by the server based on identification information of the target file, whether a record hash value associated with the target file exists;
   if the record hash value is determined to exist, sending, by the server, the record hash value to the client; and
   if the record hash value is determined to not exist, sending, by the server, prompt information indicating that the target file is being uploaded to the blockchain.

5. The method of claim 1, further comprising, before the uploading:
   initiating, by the server to the client, a contract signing transaction for triggering an electronic signature operation on a target file transmission contract;
   receiving, by the server from the client, a signed version of the target file transmission contract; and
   uploading, by the server to the one or more blockchain nodes, the signed version of the target file transmission contract.

6. The method of claim 2, further comprising, before the receiving the query request:
   receiving, by the server from a first transaction terminal, the file template associated with the project;
   sending, by the server to a second transaction terminal, prompt information of whether to upload the file template to the blockchain, the prompt information carrying identification information of the file template;
   receiving, by the server from the second transaction terminal, a selection result indicating uploading the file template to the blockchain;
   in response to receiving the selection result, sending, by the server to the one or more blockchain nodes, the file template;
   receiving, by the server from the one or more blockchain nodes, a hash value indicating that the file template is written into the blockchain; and
   saving, by the server, the received hash value in a database.

7. The method of claim 1, further comprising:
   in response to receiving the user input selecting to upload the target file, hashing, by the server, the target file to generate a digital digest;
   signing, by the server, the digital digest according to an asymmetric encryption algorithm using a private key associated with a cryptographic key pair to obtain a digital signature; and
   uploading, by the server to the one or more blockchain nodes associated with the blockchain, the digital signature and a public key associated with the cryptographic key pair.

8. The method of claim 1, further comprising:
   receiving, by the one or more blockchain nodes from the server, the target file, a digital signature, and a public key;
   validating, by the one or more blockchain nodes, the target file by:
      decrypting the digital signature using the public key to generate a first digital digest,
      hashing the target file to generate a second digital digest, and
      determining that the first digital digest is consistent with the second digital digest;
   generating, by the one or more blockchain nodes, a record hash value based on the target file; and
   sending, by the one or more blockchain nodes to the server, the record hash value.

9. A system, comprising a processor and a non-transitory computer-readable storage medium storing instructions executable by the processor to cause the system to perform operations comprising:
   receiving, from a client, a request for joining a project;
   determining a file template and detail information associated with the project;

generating a first file related to the project based on the detail information associated with the project and the file template;

initiating, to the client, a file signing transaction for triggering electronic signing of the first file;

receiving, from the client, a second file corresponding to a signed version of the first file;

performing a certification authority seal operation on the second file based on a certification authority certificate to generate a target file;

receiving, from the client, a user input selecting to upload the target file to a blockchain; and uploading, to one or more blockchain nodes associated with the blockchain, the target file.

10. The system of claim 9, where the operations further comprise:

receiving, from the client, a query request for the target file, the query request comprising identification information of the target file; and obtaining the target file based on the identification information of the target file.

11. The system of claim 9, wherein the operations further comprise:

receiving a record hash value associated with the target file returned by the one or more blockchain nodes.

12. The system of claim 9, wherein the operations further comprise:

receiving a query request for digest information of the target file;

determining, based on identification information of the target file, whether a record hash value associated with the target file exists;

if the record hash value is determined to exist, sending the record hash value to the client; and if the record hash value is determined to not exist, sending prompt information indicating that the target file is being uploaded to the blockchain.

13. The system of claim 9, wherein the operations further comprise, before the uploading:

initiating, to the client, a contract signing transaction for triggering an electronic signature operation on a target file transmission contract;

receiving, from the client, a signed version of the target file transmission contract; and uploading, to the one or more blockchain nodes, the signed version of the target file transmission contract.

14. The system of claim 10, wherein the operations further comprise, before the receiving the query request:

receiving, from a first transaction terminal, the file template associated with the project;

sending, to a second transaction terminal, prompt information of whether to upload the file template to the blockchain, the prompt information carrying identification information of the file template;

receiving, from the second transaction terminal, a selection result indicating uploading the file template to the blockchain;

in response to receiving the selection result, sending, to the one or more blockchain nodes, the file template;

receiving, from the one or more blockchain nodes, a hash value indicating that the file template is written into the blockchain; and saving the received hash value in a database.

15. The system of claim 9, wherein the operations further comprise:

in response to receiving the user input selecting to upload the target file, hashing the target file to generate a digital digest;

signing the digital digest according to an asymmetric encryption algorithm using a private key associated with a cryptographic key pair to obtain a digital signature; and uploading to the one or more blockchain nodes associated with the blockchain, the digital signature and a public key associated with the cryptographic key pair.

16. A non-transitory computer-readable storage medium, configured with instructions executable by one or more processors to cause the one or more processors to perform operations comprising:

receiving, from a client, a request for joining a project;

determining a file template and detail information associated with the project;

generating a first file related to the project based on the detail information associated with the project and the file template;

initiating, to the client, a file signing transaction for triggering electronic signing of the first file;

receiving, from the client, a second file corresponding to a signed version of the first file;

performing a certification authority seal operation on the second file based on a certification authority certificate to generate a target file;

receiving, from the client, a user input selecting to upload the target file to a blockchain; and uploading, to one or more blockchain nodes associated with the blockchain, the target file.

17. The medium of claim 16, wherein the operations further comprise:

receiving, from the client, a query request for the target file, the query request comprising identification information of the target file; and obtaining the target file based on the identification information of the target file.

18. The medium of claim 16, wherein the operations further comprise:

receiving a query request for digest information of the target file;

determining, based on identification information of the target file, whether a record hash value associated with the target file exists;

if the record hash value is determined to exist, sending the record hash value to the client; and if the record hash value is determined to not exist, sending prompt information indicating that the target file is being uploaded to the blockchain.

19. The medium of claim 16, wherein the operations further comprise, before the uploading:

initiating, to the client, a contract signing transaction for triggering an electronic signature operation on a target file transmission contract;

receiving, from the client, a signed version of the target file transmission contract; and uploading, to the one or more blockchain nodes, the signed version of the target file transmission contract.

20. The medium of claim 17, wherein the operations further comprise, before the receiving the query request:

receiving, from a first transaction terminal, the file template associated with the project;

sending, to a second transaction terminal, prompt information of whether to upload the file template to the blockchain, the prompt information carrying identification information of the file template;

receiving, from the second transaction terminal, a selection result indicating uploading the file template to the blockchain;

in response to receiving the selection result, sending, to the one or more blockchain nodes, the file template;

receiving, from the one or more blockchain nodes, a hash value indicating that the file template is written into the blockchain; and saving the received hash value in a database.

* * * * *